May 2, 1939.　　　L. G. KNAPP　　　2,156,992
WASHING MACHINE
Filed Oct. 7, 1935　　　5 Sheets-Sheet 1

Inventor
Leland G. Knapp
by Charles O. Wells Attys.

May 2, 1939.     L. G. KNAPP     2,156,992
WASHING MACHINE
Filed Oct. 7, 1935     5 Sheets-Sheet 2

Fig. 2

Inventor
Leland G. Knapp.
by Charles H. Fields Attys.

May 2, 1939.   L. G. KNAPP   2,156,992
WASHING MACHINE
Filed Oct. 7, 1935   5 Sheets-Sheet 3

May 2, 1939.  L. G. KNAPP  2,156,992
WASHING MACHINE
Filed Oct. 7, 1935  5 Sheets-Sheet 4

Patented May 2, 1939

2,156,992

UNITED STATES PATENT OFFICE 2,156,992

WASHING MACHINE

Leland G. Knapp, Chicago, Ill.

Application October 7, 1935, Serial No. 43,836

6 Claims. (Cl. 68—22)

This invention relates to improvements in washing machines, and more particularly to washing machines of the character used in individual households for family laundering purposes, the invention including the construction of the machine and the method of making certain parts of the machine, although the invention may have other uses and purposes as will be apparent to one skilled in the art.

The commercial market for washing machines, especially those designed for household purposes in individual family usage, was limited to a considerable and objectionable extent because the machines could not be manufactured and sold at a sufficiently low figure to come within the means of a great number of potential users. Heretofore, the acquisition of the necessary durability, stability and rigidity and ease of control of the operating parts has resulted in a product sufficiently expensive to prohibit its use by a material portion of the potential consumer field. In addition, machines of this character heretofore known were so constructed that considerable labor and expense was involved in the making of repairs or replacing of parts that had become worn or broken, so that the user was subject not only to the expense of the new part or unit but also to a considerable item of expense for the labor involved in the taking out of the old part and installing of the new part, which considerable time wasted in which the machine must of necessity stand idle.

With the foregoing in mind, it is an important object of the present invention to provide a complete washing machine in which a material number of the parts are made by simple die-casting and punching or stamping operations, with all of the parts so arranged that complete assembly is a very simple process, with a result that the machine, while having the necessary and desired durability, stability and rigidity, may nevertheless be manufactured and sold at a very economical figure.

Another object of this invention is the provision of a washing machine in which various salient units of the machine may be readily removed in their entirety and as easily replaced.

Also an object of this invention is the provision of a washing machine of such economical and simple construction that it is quite feasible in connection with most of the salient units of the machine to merely remove a unit having a worn or broken part and replace the same with a new unit, thus keeping the machine idle for only a very short length of time and avoiding the expense for labor in connection with repairs.

Still another feature of the invention is the provision of a washing machine in which many of the parts are stamped out of relatively light stock, these parts having integral stiffening formations therein.

It is also an aim of the invention to provide a washing machine in which the main supporting parts including the over-all cabinet are made by simple stamping processes and welded or similarly secured together to provide the necessary rigidity and strength, whereby these parts may be made of relatively light and economical material.

A further feature of the invention resides in the provision of a washing machine provided with a wringer and a selective reverse drive therefor, the wringer and drive being removable from the machine by the simple expedient of lifting it off the machine, there being no necessity to unfasten any holding means.

The present invention also embodies a transmission enclosed in a sealed-in housing forming a unitary structure, the transmission being driven from a motor by a belt and pulley drive, there being means incorporated to automatically maintain tension upon the belt.

An additional feature of the invention resides in the fact that certain major parts of the machine may be formed by a simple stamping process with what may be practically termed no waste of material whatsoever.

The present invention also embodies a novel method of making a washing machine of the character described herein, with special reference to the method of making the cabinet body and supporting legs therefor, and also to the method of making the cabinet top, tub and tub cover.

The invention comprises in general a washing machine including a cabinet structure enclosing substantially all parts of the machine with the exception of the wringer and its mounting. The cabinet is supported on legs, and the entire cabinet including the legs is formed by welding together a plurality of simple stampings made from sheet metal. Inside the cabinet, the main supporting member is welded to the side walls of the cabinet, this member also being a simple metallic stamping and having a formation such as to add to its rigidity and strength. Suspended from the underside of this member is a drive motor together with a transmission unit, this unit being so connected as to drive the wringer and also the agitator. The tub of the machine rests upon this supporting member and is secured thereto. The wringer and its reverse drive is carried as a unit by the cover of the cabinet. The tub cover, which of course is separable from the top or cover of the cabinet, is merely a piece cut out of the top of the cover when the latter is stamped and provided with a peripheral sealing flange which holds the cover removably in place over the tub. The various salient units of the machine, including the motor and its mounting, the transmission unit, the wringer and its reverse drive, and the agitator and tub, may each be removed from the machine by a very simple operation. The wringer and its reverse drive may simply be lifted off the machine and replaced on the machine by merely setting it in position, without the loosening or tightening of any fastening means whatsoever. The other salient units of the machine may each be removed by loosening a very few simple bolt and nut or lock connections. In the main, the entire structure is formed of die-cast or stamped parts of extremely economical character and so arranged as to facilitate quick and ready assembly.

While some of the more salient features, characteristics and advantages of the present invention have been above pointed out, others will become apparent from the following disclosures, taken in conjunction with the accompanying drawings, in which.

As shown on the drawings.

For the purposes of illustrating the present invention, I have selected an embodiment which includes a substantially square cabinet with the various salient units disposed in feasible and convenient locations with respect to the cabinet, and the various controls located in easily accessible positions adjacent the top of the structure. It will, of course, be understood that the various salient units may be disposed in other positions, the controls may be located at other places if deemed desirable, the cabinet may be round or substantially any other desirable shape rather than square, and similar variations may be made throughout the construction without departing from the spirit and principle of the invention involved.

Construction in general

With reference more specifically to Figures 1, 2, 3 and 4, it will be seen that the washing machine includes a cabinet comprising a plurality of legs 1, in this instance four, and an equal number of side plates 2. The cabinet is provided with a cover 3. Inside the cabinet, a horizontally disposed main support 4 is provided which directly carries the major number of working parts of the machine.

Figure 2:
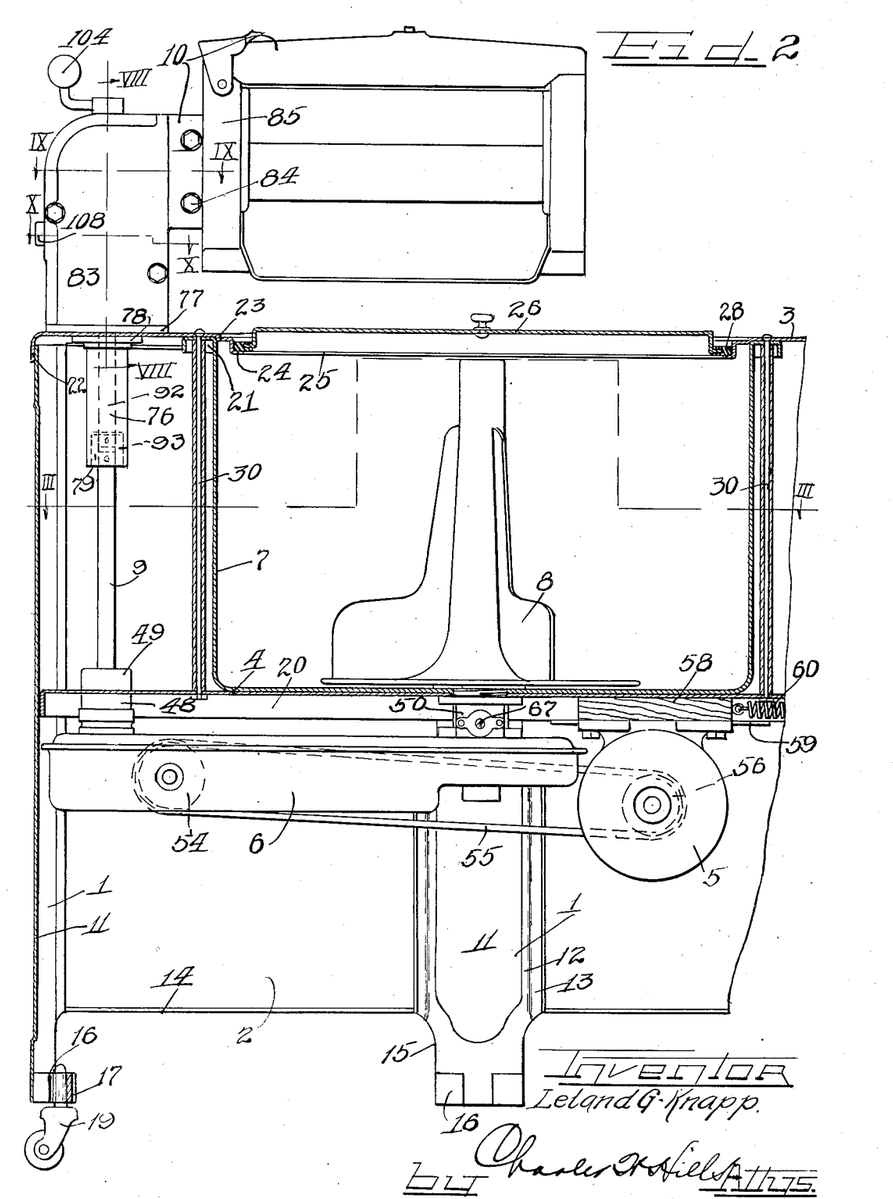
Figure 2 is an enlarged fragmentary vertical sectional view, with parts in elevation, taken substantially as indicated by the line II—II of Figure 1.

A driving motor 5, which may be any suitable form of electric motor, is suspended from the underside of the support 4 and is arranged to drive a transmission contained in a sealed housing 6, the housing and transmission also being suspended from the underside of the support 4.

The housing construction and transmission, generally indicated by numeral 6, is in itself the subject matter of my copending application for patent entitled "Crank case assembly and method of making the same", filed September 16, 1935, Serial No. 40,729, so specific details of the transmission will not be given herein.

Seated on the top of the support 4 is a tub 7 to contain articles to be laundered in the washing machine. The tub contains a suitable paddle or agitator 8 driven by a portion of the transmission 6.

Outside of the tub, but inside of the cabinet, a drive shaft 9 (Figure 2) extends upwardly into engagement with a wringer and reverse drive assembly generally indicated by numeral 10. The wringer and its reverse drive assembly is supported by the top or cover 3 of the cabinet in a manner to be later described. The shaft 9 is driven by another portion of the transmission 55 in a manner outlined in my aforesaid copending application.

As to the agitator 8 and the wringer, with the exception of one side of the frame to be later mentioned herein, these may be of any desirable or suitable construction.

Cabinet, tub and cover construction

Figure 3:
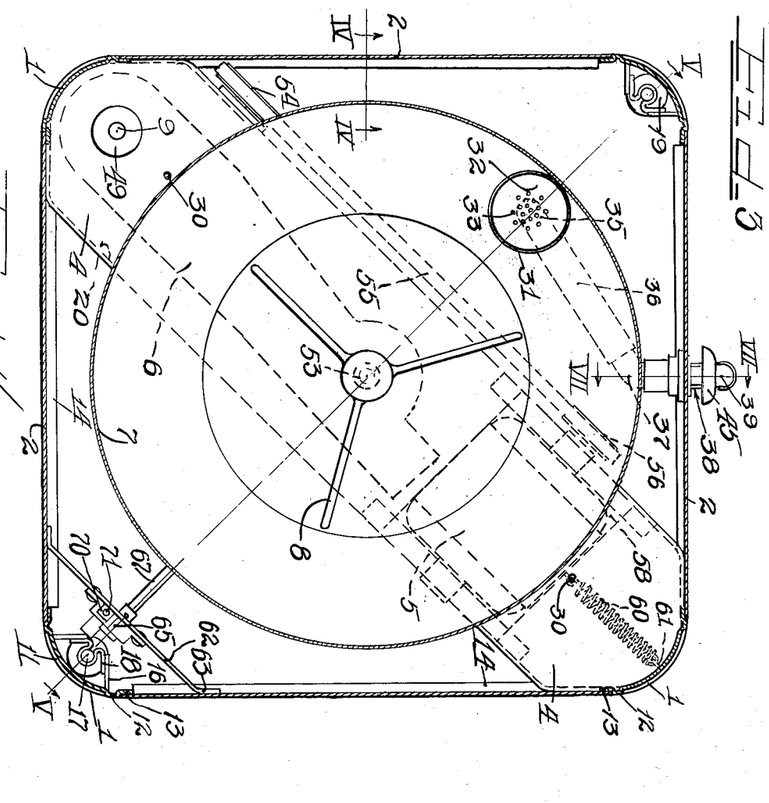
Figure 3 is a plan sectional view, taken substantially as indicated by the staggered section line III—III of Figure 2.

As seen best in Figures 2 and 3, each leg 1 may be made by a single simple stamping operation. The leg is indented as at 11 for nearly its entire length merely for the purpose of ornamentation. This indentation 11 is only in the central portion of the leg and on each side thereof a vertical ridge 12 is provided, and each ridge 12 terminates laterally in an indented vertically extending flange 13. The flanges 13 of each leg are indented substantially the thickness of one of the side walls 2 of the cabinet, so that when one of these side walls is placed in position upon the flanges 13 between a pair of adjacent legs, the outside of the cabinet is even and symmetrical.

A side wall 2, which is also a metal stamping, is placed in position upon the flanges 13 of a pair of adjacent legs and welded to the legs in the overlapping parts thereof. In this manner, an integral construction comprising four legs and four side walls, in the present instance, is provided. It is therefore apparent that the cabinet, while comprising only simple and economical metallic stampings, is nevertheless strong and sturdy, the upper and lower marginal portions of the side walls 2 being turned inwardly substantially at right angles, as indicated at 14, to further strengthen these walls.

At the bottom thereof, each leg is cut in, as seen at 15 in Figure 2, leaving a pair of ears 16 which are bent inwardly. A caster socket 17 having lateral flanges 18 is welded or similarly secured to the ears 16 on each leg. In each of these sockets, a suitable caster 19 may be inserted so that the machine may be moved easily from place to place.

Inside the cabinet, the main support 4 which is downwardly flanged all around, as indicated at 20, is firmly welded to the side walls 2, this support extending diagonally across the cabinet and being shaped at each end thereof to fit the rounded corners of the cabinet. When so placed, the support is not only capable of carrying the weight imposed thereon but also stiffens and strengthens the cabinet. The support is a simple metallic stamping made in a single operation.

Figure 4:
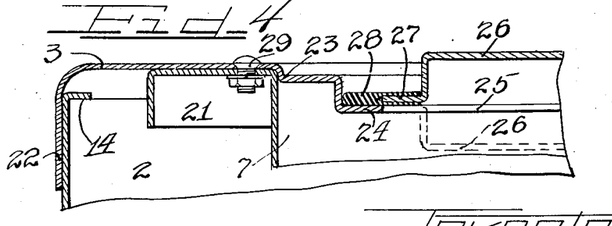
Figure 4 is a greatly enlarged fragmentary sectional view, taken substantially as indicated by the line IV—IV of Figure 3.

The aforesaid tub 7, which may also be made by a simple stamping operation, is seated upon the support 4 inside the cabinet. With reference more particularly to Figure 4, it will be seen that the upper margin of the tub is turned outwardly and downwardly to form a laterally extending rim 21 in the form of an annular inverted channel.

The aforesaid cover 3 for the cabinet is provided with a depending flange 22 therearound for embracing the upper portion of the side walls 2 and legs 1. In its inner portion the cover 3 is stepped inwardly or downwardly as at 23 (Figure 4) to provide a shoulder against which the channeled rim 21 of the tub 7 may seat. Inside the depression 23, the cover is provided with a depressed lateral flange 24 surrounding an aperture 25 through which access is had to the interior of the tub. A removable cover 26 is provided for the tub, this cover having a laterally extending flange 27 therearound provided with a circumferential sealing lip 28 made of rubber or some similar material, the lip 28 resting upon the aforesaid flange 24 when the tub cover is in position.

A novel method is involved in the making of the cabinet cover 3 and the tub cover 26. It will be noted that the circumference of the flange 27 on the tub cover is substantially the same as that of the opening 25, and in reality the flange 27 justs fits within the opening 25, prior to the application of the lip 28. The cabinet cover 3 and tub cover 26 are made initially in one piece; that is, the tub cover 26 is in inverted position and a piece of metal is stamped to form both the cover 3 and tub cover 26. This may be done in a single operation, and either in the same or a subsequent operation, the stamping is cut to separate the tub cover 26 and provide the aperture 25, after which the tub cover is removed, supplied with the lip 28 and placed on the cabinet cover 3 in inverted position.

Figure 1:
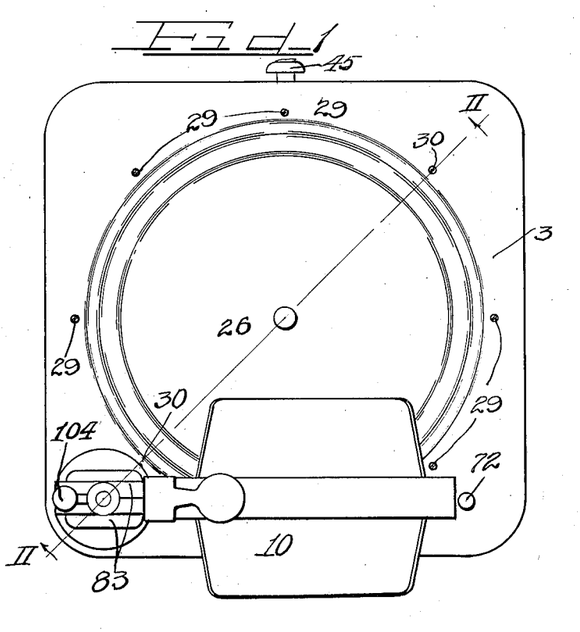
Figure 1 is a top plan view of the entire machine.

The tub 7 is joined to the cabinet cover 3 through the rim 21 by means of a plurality of bolt and nut connections generally indicated by numeral 29 (Figures 1 and 4). There is also provided any desirable number, two being shown, of relatively long bolts 30 surrounded by suitable spacers and also extending through the cabinet cover and flange 21 of the tub and downwardly through the support 4 where each is held by a nut. Of course, these bolts extend downwardly outside of the tub (Figure 2). By these means, the tub is not only joined to the cabinet cover, but both the tub and cabinet cover are also joined to the main support 4.

Drain arrangement for the tub

Figure 5:
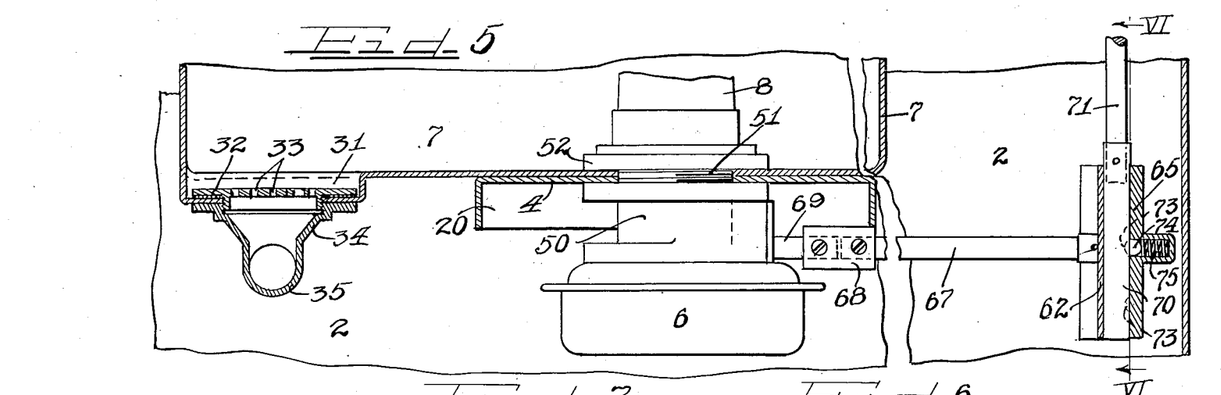
Figure 5 is an enlarged fragmentary vertical sectional view, with parts in elevation, taken substantially as indicated by the line V—V of Figure 3.
Figure 7:
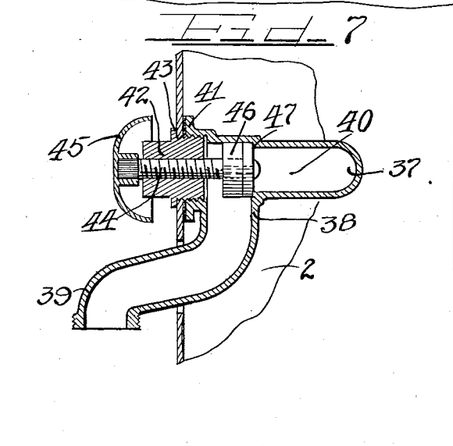
Figure 7 is an enlarged fragmentary vertical sectional view, with parts in elevation, taken substantially as indicated by the line VII—VII of Figure 3, illustrating in detail a part of the outlet or drain arrangement including the petcock.

In connection with the present invention, I have provided a novel drain arrangement for the tub which may be very simply and economically incorporated. With reference to Figures 3, 5 and 7, it will be seen that adjacent the side wall of the tub, the bottom thereof is provided with a circular depression 31. Seated in this depression is a bushing member 32 having a plurality of apertures 33 in the central portion thereof. The bushing member extends through and is threadedly engaged in a suitable threaded aperture in the bottom of the depression, there being a suitable gasket disposed between the flange of the bushing and the bottom of the depression. Outside the depression 31 is another bushing member 34 threadedly engaged with the shank of the member 32. The bushing 34, which may be die-cast, is substantially cup-shaped and terminates at the bottom in an outlet nipple 35, which is connected by means of a flexible pipe 36, indicated in dotted lines in Figure 3, to a similar nipple 37 formed integrally with the body of a drain cock 38 having an outlet nozzle 39 extending through a suitable aperture in one of the cabinet walls 2. This drain cock 38, which is preferably die cast, is shown in detail in Figure 7, and a passage 40 in the body portion establishes communication between the nipple 37 and the nozzle 39. The body part of the cock 38 is flanged as 41 opposite the outer end of the passage 40. A suitable gasket is interposed between the flange 41 and the side wall 2 of the cabinet, and a valve bonnet 42 extending through a threaded aperture in this side wall is threadedly engaged in the flanged part 41. The bonnet member is flanged as at 43 for engagement against the outer surface of the wall 2. This bonnet 42 is provided with a screw threaded aperture to accommodate a valve stem 44 carrying on its outer end an operating wheel 45 and on its inner end a valve member 46 arranged to seat against an annular shoulder 47 defining the end of the aforesaid passage 40 and cutting off communication between the nipple 37 and the nozzle 39 when the valve is closed. It will be noted that the bonnet and valve is a unitary mechanism which may be inserted as a unit and the complete drain cock assembly is mounted on the cabinet wall by the simple expediency of threadedly engaging the bonnet 42 in the flanged part 41 of the body portion 38.

In the foregoing manner, as extremely economical drain arrangement is provided for the tub 7, and the outlet of fluid from the tub is controlled merely by the operation of the valve wheel 45 disposed outside of the cabinet in a convenient location for the operator.

Filter mounting and transmission arrangement

The transmission 6, which is described in detail in my aforesaid copending application, is connected to the main support 4 adjacent one end thereof by a bushing member 48 (Figure 2) having a shank extending through a suitable aperture in the support 4 and engaged above the support 4 by a nut 49, the wringer drive shaft 9 extending through both the bushing 48 and nut 49. Adjacent the other end thereof, the transmission 6 is connected both to the main support 4 and bottom of the tub 7 by means of a bushing 50 (Figs. 2 and 5) having a reduced threaded shank 51 extending through a suitable aperture in the support 4 and bottom of the tub 7, and a nut 52 engaged with the shank 51 inside the tub beneath the agitator 8, there being a suitable water-tight sealing connection between the tub bottom and nut 52. An agitator drive shaft 53, seen in dotted lines in Figure 3, extends upwardly through the shank 51 of the bushing 50, and the agitator seats upon the upper end of this shaft, all as more fully set forth in my aforesaid copending application.

The main drive shaft of the transmission 6 carries on its outer end a pulley 54 (Figures 2 and 3) which is driven through a suitable belt 55 by the drive pulley 56 of the aforesaid motor 5.

Figure 12:
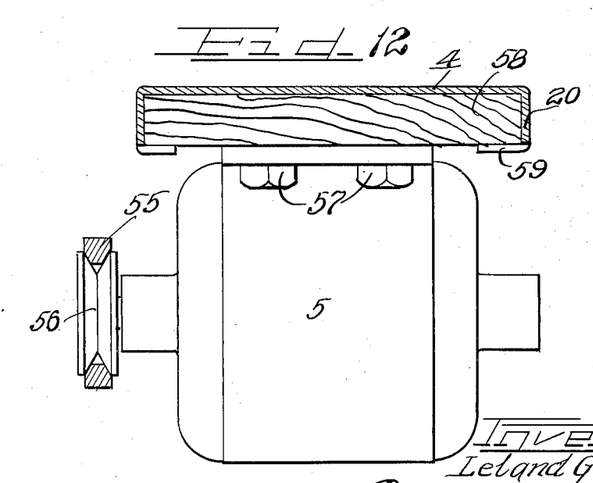
Figure 12 is an enlarged vertical sectional view through the main supporting member illustrating the motor mounting.

As seen best in Figure 12, the motor housing is bolted, as at 57, to a wooden block 58 slidable in a track formed by inwardly turned opposed flanges 59 integral with the side flanges 20 of the main support 4. With reference now to Figures 2 and 3, it will be seen that a tension spring 60 is secured at one end to the block 58 and at the other end to a suitable eye or the equivalent 61 firmly secured to the inside face of one of the legs 2 of the cabinet. This spring 60 exerts a constant pull upon the block 58 and thereby maintains proper driving tension on the belt 55 at all times.

Agitator drive control

As fully explained in my aforesaid copending application, the bushing 50 adjacent one end of the transmission 6 contains a pair of clutch members movable into and out of engagement to cause selective operation of the agitator or paddle 8, the transmission operating continuously. These clutch members are engaged and disengaged by rotating an eccentric member associated with one of the clutch members through an arc of substantially 90 degrees. Novel means are provided herein for actuating the clutch means for the selective operation of the agitator or paddle 8.

Figure 6:
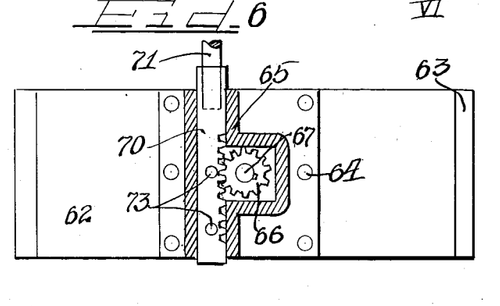
Figure 6 is a fragmentary vertical sectional view, with parts in elevation, taken substantially as indicated by the line VI—VI of Figure 5, with the cabinet wall removed.

With reference particularly to Figures 3, 5 and 6, there is seen a supporting element 62 in the form of a flat metallic stamping provided with angularly disposed side flanges 63 which are welded to adjacent side walls 2 of the cabinet so that the element 62 extends across an inside corner of the cabinet. Bolted to this supporting element 62 as at 64 is a die-cast housing 65. This housing contains a pinion 66 carried on the end of a shaft 67 extending through the support 62. The opposite end of the shaft 67 is fixedly connected by a suitable coupling 68 (Figure 5) to another shaft 69 which is in turn connected with the aforesaid clutch means. In order to rotate the shaft 67 and likewise the shaft 69 substantially 90 degrees to operate the clutch means, a rack 70 is disposed in the housing 65 in toothed engagement with the pinion 66. A lever 71 is connected to the upper end of the rack and extends upwardly inside of the cabinet and through the cover 3 thereof to an operating handle 72 disposed in a convenient location above the cover 3 (Figure 1). The rack 70 is provided with a pair of spaced recesses or notches 73 each of which may be engaged by a ball 74 pressed against the rack by a compression spring 75. The engagement of these notches with the ball 74 may be felt through the handle 72 so that the operator will know when the rack has been moved sufficiently in either direction to engage or disengage the clutch means, as the case may be.

Accordingly, it will be noted that from a handy position on the top of the cabinet, the operation of the agitator may be very simply controlled.

Wringer mounting and reverse drive arrangement

A novel unitary wringer and reverse drive assembly is provided for the present invention and is best seen in Figures 1 and 2, with structural details thereof shown in Figures 8, 9, 10 and 11. The entire wringer assembly is carried by the cover 3 of the cabinet together with what little weight may be supported by the wringer drive shaft 9, this latter weight being substantially negligible. The wringer 10 is supported only at one side of the frame thereof (Figure 2), so that the wringer may freely rotate through a complete revolution in either direction.

Figures 8, 9, 10, 11:
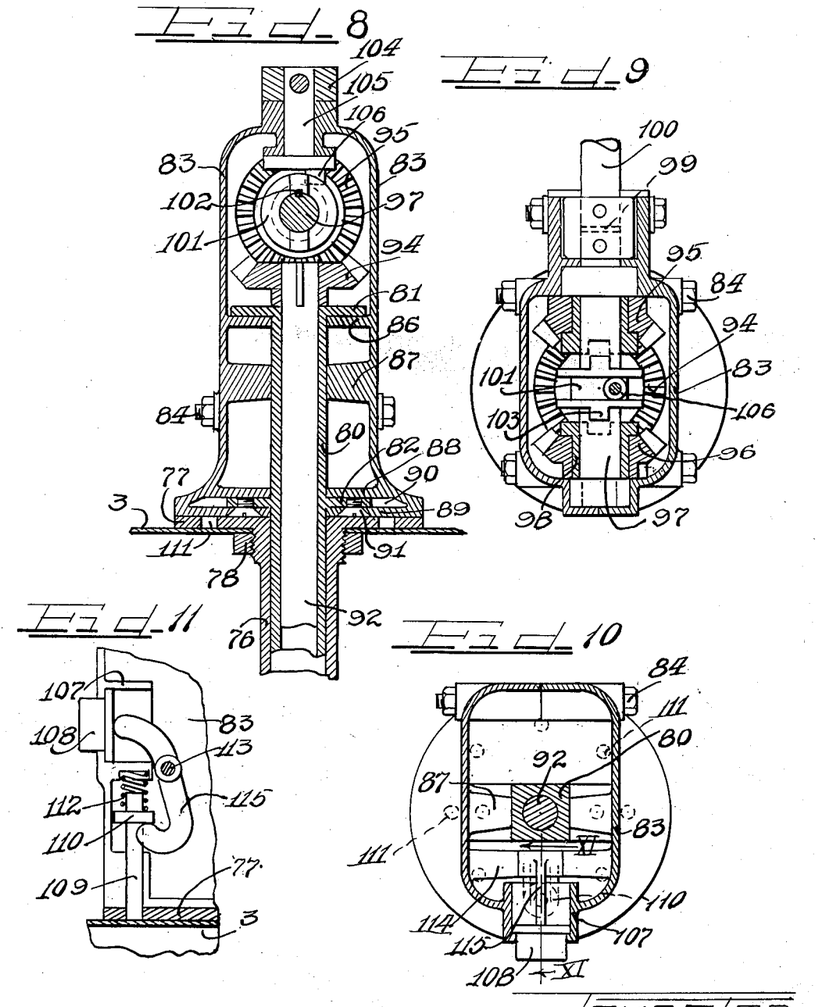
Figure 8 is an enlarged fragmentary vertical sectional view, with parts in elevation, taken substantially as indicated by the line VIII—VIII of Figure 2, illustrating the supporting casting and reverse drive mechanism for the wringer.
Figure 9 is an enlarged fragmentary plan sectional view of the wringer drive, taken substantially as indicated by the line IX—IX of Figure 2.
Figure 10 is also an enlarged fragmentary plan sectional view of the wringer casting and drive but taken on a lower plane than Figure 9, substantially as indicated by the line X—X of Figure 2.
Figure 11 is an enlarged fragmentary vertical sectional view, with parts in elevation, of the structure shown in Figure 10, taken substantially as indicated by the line XI—XI of Figure 10.

As seen in Figures 2 and 8, an elongated supporting bushing 76, flanged as at 77 to overlie the cover 3, extends downwardly through a threaded aperture in the cover 3 and is held in position by a nut 78 in tight engagement with the underside of the cover 3. The lower end of this bearing bushing is hollowed, as indicated in dotted lines at 79 (Figure 2) to loosely overlie the upper end of the drive shaft 9. Inside the bearing bushing 76 and extending thereabove, is an elongated bearing 80, preferably of square cross-section (Figure 10) but having a round central aperture therethrough. This bearing is provided with an upper integral flange 81 and a lower integral flange 82 for purposes that will later appear.

The wringer drive housing comprises a pair of complemental castings 83, each being identical with the other but arranged for opposite disposition. The two die-castings 83 may be held together with a reverse drive mechanism therebetween by means of a series of bolts 84 disposed at convenient points. As seen best in Figure 2, the castings 83 are preferably formed integral with the adjacent vertical member 85 of the wringer frame.

The interior formation of each casting 83 includes an annular supporting flange 86 (Figure 8) upon which the flange 81 of the bearing 80 rests so that the bearing is supported in part by this flange. Below the flange 86 is a relatively large strengthening rib 87 through which the bearing 80 extends, this rib rigidifying the construction. The base portion of the casting is designed to fit intimately on top of the flange 77 of the bearing bushing 76, and inwardly projecting from this portion of the casting is a pair of inwardly extending flanges 88 and 89, respectively, defining a space 90 therebetween of the proper size to just accommodate the lower flange 82 of the bearing 80. It will therefore be seen that the bearing is supported in position by means of its flanges 81 and 82. The lower flanges or bases 89 of the castings 83 are secured to the flange 82 by means of a series of screws 91. It will therefore be seen that the entire structure relating to the wringer is unitary and may be lifted out of the bearing bushing 76, the elongated bearing 80 being slidable therein.

Rotatable in the elongated bearing 80 is a shaft 92 which, as indicated in dotted lines in Figure 2, has an end 93 adapted for interlocking engagement with the upper end of the main wringer drive shaft 9. The shaft 92 when placed in position will seat itself in interlocked engagement with the shaft 9 to be driven thereby. At the upper end of the shaft 92 a bevel gear 94 is keyed thereto and the lower part of this bevel gear rests upon the flange 81 of the bearing 80. This bevel gear 94 is in constant mesh with a pair of bevel gears 95 and 96 disposed on opposite sides of the gear 94 so that the gears 95 and 96 will be driven in opposite directions. The gears 95 and 96 are disposed loosely around a transverse shaft 97, there being a floating bearing bushing 98 between these gears and the shaft 97.

The shaft 97 is fixedly coupled, as indicated at 99 in Figure 9, to a shaft 100 extending into the wringer frame 85 and driving the rolls of the wringer in a well-known manner.

In order to selectively drive the wringer from either of the gears 95 or 96, a clutch member 101 is slidably mounted on the shaft 97 and keyed thereto as indicated at 102 in Figure 8. This clutch member on each side thereof is provided with a projection 103 designed for engagement in a corresponding recess in the respective bushing 98. Each of the bushings 98 is force fitted or die cast in its respective bevel gear 95 or 96 so that the bevel gear must rotate with the bushing. Accordingly, it will be seen that when the clutch member 101, shown in neutral position in Figure 9, is moved into engagement with the bushing and gear 95, the wringer rolls will be rotated in one direction, and when the clutch member is moved into engagement with the bushing and gear 96, the wringer rolls will rotate oppositely.

With reference to Figures 1, 2, 8 and 9, it will be seen that a handle 104 mounted on top of the housing formed by the castings 83 is keyed to a depending shaft 105 carrying a suitable roller 106 in the lower part thereof, this roller being engaged with the aforesaid clutch 101 to actuate the clutch member in either direction and selectively drive the wringer rolls by the gear 95 or the gear 96. It will thus be seen that from a convenient point at the top of the machine the wringer may be easily and selectively controlled to pass laundered articles therethrough in either direction.

With reference more particularly to Figures 8, 10 and 11, construction will be seen permitting the wringer to be readily swung through a complete revolution in either direction.

On the side opposite the wringer, the two castings 83 are complementally formed to provide a housing 107 in which a push button 108 is reciprocable. Beneath the housing is a vertical pin 109, shouldered at its upper end as indicated at 110, and extending downwardly through any of a series of apertures 111 in the flange 77 of the bearing bushing 76. This pin is urged downwardly at all times by a coil spring 112 disposed between the shoulder 110 and the housing 107. A stub shaft 113, disposed transversely and journaled in suitable bosses 114 integral with the castings 83, carries a bell crank lever 115 which abuts the push button 108 at one end thereof and hooks beneath the flange 110 at the other end thereof. When the push button is pressed inwardly, the bell crank lever 115 elevates the pin 109 and permits the entire wringer assembly to be rotated upon the top face of the flange 77 of the bearing bushing 76. The pin may be immediately released if the wringer is to be rotated only to the next aperture 111, and the pin will automatically drop in place. Of course, if the wringer is to be swung through a greater arc, the push button must be held until the wringer is adjacent the desired position.

*General features of the machine*

From the foregoing, it is apparent that the entire washing machine may be readily and easily handled, all of the controlling parts, including the agitator control member 72, the wringer control member 104, and the wringer adjustment button 108 are all readily accessible at the top of the machine. The valve wheel 45 from the drain cock projects through the side wall of the cabinet in a handy position.

In the event any part of the machine becomes worn or broken, replacements may be made with great facility. In dismantling the machine, it is a simple expedient to grasp and lift the wringer together with the housing formed by the castings 83 and the entire reverse drive mechanism for the wringer off the machine. It is not necessary to loosen any connection to accomplish this, since the elongated bearing 80 will readily slide out of the bearing bushing 76. By the simple expedient of loosening the few elongated bolts 30, and removing the clutch control knob 72, the entire cover may readily be lifted off the cabinet, carrying therewith the tub cover 26. If the wringer has not been previously removed, the entire wringer assembly also will be lifted off the machine with the cover. Access is thereupon had to various parts inside the cabinet for the making of minor repairs.

If it is desired also to remove the tub 7, it is a simple expedient to lift out the agitator, unscrew the nut 52 beneath the agitator, disconnect the flexible outlet conduit 36 at one end, and lift the tub out of the cabinet.

A simple disconnection of the nut 49 associated with the wringer drive shaft 9, and the couplings 68 connecting the two parts of the clutch shaft, permits the entire transmission 6 to be removed. The motor tensioning spring 60 may be unhooked at one end, and the entire motor block slid out of the track in the main frame member 4.

By this means of dismantling the machine, any unitary part of the machine may be removed and replaced with the greatest facility, eliminating time wasted in labor and minimizing the time in which the machine must remain idle. Insofar as the transmission 6 and similar constructions are concerned, it is more feasible to remove the entire unit and substitute a new unit in lieu thereof, rather than endeavor to repair the old, the construction being sufficiently economical to warrant such action.

From the foregoing, it is believed that the novel method of constructing the cabinet, the novel method of constructing the cabinet cover together with the tub cover, and other novel features of the machine will be apparent without further description herein.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a washing machine, a cabinet, supporting means therein, a tub seated on said supporting means, a removable cover for said cabinet secured to said tub, releasable securing means also connecting said cover to said supporting means, and a wringer and drive assembly carried by said cover, whereby upon the releasement of said securing means said cover, tub, and assembly may be removed as a unit.

2. In a washing machine, cabinet side walls, means supporting said side walls, a horizontal supporting means extending across said walls and connected thereto, a sheet metal tub seated on said supporting means and having an outwardly extending margin at the top thereof, a sheet metal cover for said cabinet connected to the outwardly extending margin of the tub, and a series of spaced means extending upwardly within said side walls and outside of said tub for supporting said cover and the margin of the tub, said series of spaced means being mounted on and carried by said supporting means at annularly spaced points.

3. In a washing machine, a cabinet having side walls, transversely extending supporting means therein, a tub within said side walls and seated on said supporting means, a removable cover for said cabinet rigidly secured to the top of said tub, releasable securing means relieving the cabinet side walls from the weight of the cover and transferring the weight of said cover downwardly to said supporting means for the support of the top of the tub, whereby when said securing means are released said tub can be removed upwardly with said cover from the cabinet.

4. In a washing machine, a cabinet having side walls, a horizontally extending tub support carried by said cabinet, a removable cover for said cabinet having downturned peripheral flanges removably embracing the top of said side walls, a tub resting on said tub support, means connecting the top of the tub to said cover, a wringer carried by said cover adjacent the top of the tub for wringing articles from the tub, driving means carried by said tub support for operating said wringer, said wringer and driving means each having complementary interlocking connections such that said wringer may be removed with said cover and separated from said driving means by lifting the same off said side walls.

5. In a washing machine, a cabinet having side walls, a horizontally extending tub support carried by said cabinet, a removable cover for said cabinet having downturned peripheral flanges removably embracing the top of said side walls, a tub resting on said tub support with its upper end engaging the lower side of said cover, means in addition to the tub and extending upwardly from said tub support inside of the cabinet between said cover and said tub support for supporting said cover, a wringer carried on said cover adjacent the top of the tub for wringing articles from the tub, driving means carried by said tub support for operating said wringer, said wringer and driving means each having complementary interlocking connections such that said wringer may be removed with said cover and separated from said driving means by lifting the same off said side walls.

6. In a washing machine, a tub enclosing cabinet having side walls, a sheet metal cover supported at the top of said side walls and having an inner flanged portion terminating in a substantially horizontal extending surface provided with a central opening, a tub cover comprising a sheet metal plate corresponding in shape to the shape of the opening in the cabinet cover and having a size such as to pass through the said central opening and a rubber extension rim on said tub cover adapted to fit on the flanged portion of the cabinet cover.

LELAND G. KNAPP.